April 6, 1926.
A. A. SHAW
1,579,959
BEVERAGE DISPENSING AND ADVERTISING MEANS
Filed April 30, 1925    2 Sheets-Sheet 1
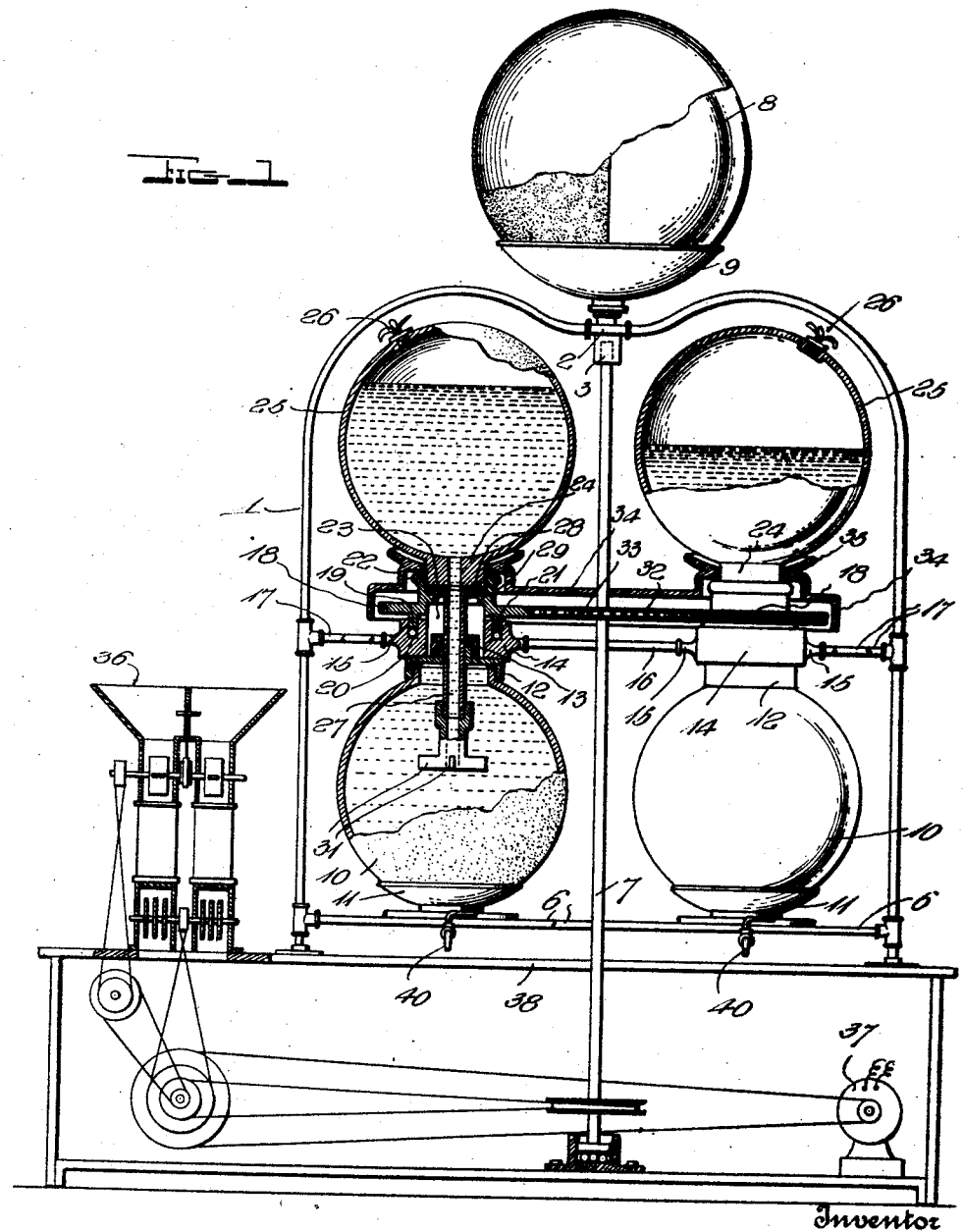
Witness
Inventor
Alva A. Shaw,
By
Attorneys April 6, 1926.  1,579,959
A. A. SHAW
BEVERAGE DISPENSING AND ADVERTISING MEANS
Filed April 30, 1925    2 Sheets—Sheet 2
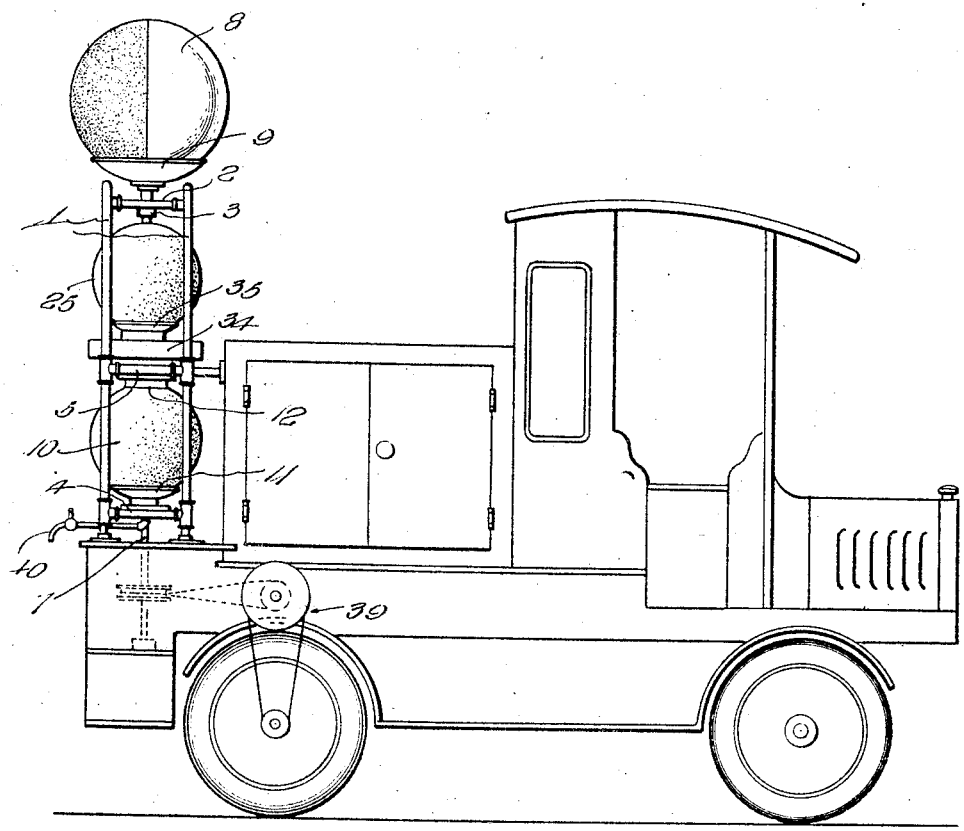

Patented Apr. 6, 1926.

1,579,959

UNITED STATES PATENT OFFICE.

ALVA A. SHAW, OF RUSTON, LOUISIANA.

BEVERAGE DISPENSING AND ADVERTISING MEANS.

Application filed April 30, 1925. Serial No. 27,094.

*To all whom it may concern:*

Be it known that I, ALVA A. SHAW, a citizen of the United States, residing at Ruston, in the parish of Lincoln and State of Louisiana, have invented certain new and useful Improvements in Beverage Dispensing and Advertising Means; and I do declare the following to be a full, clear, and exact description of the invention, such as will enable others skilled in the art to which it appertains to make and use the same.

My invention relates to improvements in apparatuses for advertising and dispensing beverages, notably fruit juices, such as those extracted from oranges and apples, and the principal object of the invention is to provide a device of the class described, in which the containing means for the beverage, simulates fruit, it being intended that if orange juice is to be dispensed, the containing means shall simulate a large orange, whereas it will represent a large apple if cider is to be dispensed.

A further object of the invention is to provide means for rotating the fruit simulating portion of the apparatus to effectively attract the attention of passersby to the stand or the like at which the beverages are being sold.

The rotatable portion of the beverage containing means is provided with a tube extending into a stationary portion of such means to establish communication between these two portions, and a further aim is to utilize this tube as carrying means for an agitator to keep the beverage well stirred, so that it will be of uniform consistency throughout.

A still further object is to provide a device of the character set forth, in which a fruit-simulating container is provided with a base representing a bowl, giving the appearance to the public of a large piece of fruit, such as an apple or an orange, resting in an ordinary bowl.

A still further aim is to provide housing means for certain driving connections for a rotatable fruit-simulating container, said housing and container jointly giving the appearance of a large piece of fruit such as an apple or an orange, rotating upon a support.

A further aim is to provide unique means for rotatably supporting a rotary fruit-simulating container above a lower container with which it communicates.

Yet another aim is to connect a driven vertical shaft with a number of fruit-simulating, beverage containers in such a manner as to rotate the latter within a supporting frame structure, and to utilize said driven shaft as carrying and driving means for an exhibitor, such as a globular body, half of which may well represent an orange, and the other half an apple, when the apparatus is designed for dispensing orange juice and cider.

A still further aim is to provide an apparatus which may be used to equal advantage on a counter within a store or stand, or upon a motor-driven vehicle, the latter mounting being particularly advantageous for use in connection with fairs, circuses, traveling carnivals and the like.

With the foregoing and minor objects in view, the invention resides in the novel subject matter hereinafter described and claimed, the description being supplemented by the accompanying drawings.

Figure 1 is a side elevation partly in section showing the invention mounted upon a counter and disposed adjacent a fruit crusher and juice extractor.

Figure 2 is an end elevation of the device showing it mounted upon a motor vehicle.

In the drawings above briefly described, a form of construction has been shown which may be considered as preferred, and while this construction will be hereinafter specifically described, it is to be understood at the outset that within the scope of the invention as claimed, numerous modifications may be made.

The numerals 1 designate two arched frames disposed in spaced, opposed relation and having their crown portions connected by a transverse member 2 which is provided with a vertical bearing 3. The legs of the frames 1 are also shown connecter by the lower transverse bars 4 and upper transverse bars 5, and the legs of each frame 1, are connected at their lower ends by a horizontal bar 6. All of the frame structures so far described as well as any to be hereinafter referred to, is preferably formed of ordinary piping and fittings, either nickel-plated or painted or otherwise treated to give an attractive appearance.

A vertical shaft 7, driven in any preferred manner, passes centrally through the frame structure and is rotatably received at its upper portion in the bearing 3. The upper end of this shaft carries a globular exhibit 8 formed of any desired material, part of said exhibit preferably simulating an apple and the other part an orange. This exhibit is provided with a base 9 representing an ordinary bowl or the like. Thus, when one side of the exhibit is toward an observer, a large orange is represented as resting in a bowl, whereas viewing the device from the other side, it appears that a large apple is supported in a bowl.

Mounted on the horizontal bars 6, between the shaft 7 and the legs of the arched side frames 1, are two stationary beverage containers 10. These containers preferably simulate fruit, one being preferably an "apple" and the other an "orange", and each of these containers is provided with a base 11 fashioned after an ordinary bowl or the like, so that here again, the impression is given of large fruit resting in a bowl. In the construction shown, the top of each container 10 is provided with a removable cap 12 having a central upstanding stuffing box 13, and disposed over each of said containers, is a bearing member 14 which may well be in the form of a substantially horizontal block. Each block is provided with oppositely projecting integral nipples 15, the inner nipples of the two blocks being connected by a horizontal bar or bars 16, while the outer nipples of said blocks are connected by horizontal bars 17, with the bars 5, the legs 1, or other desired parts of the frame structure. Thus, the bearing members or blocks 14 are rigidly supported.

Rotatably supported by each bearing block 14, and disposed over the latter, is a horizontal wheel 18, said wheel preferably having a downwardly projecting annular flange 19 received in a groove 20 in the upper side of the block, ball bearings 21 being preferably located in said groove as shown. The upper side of each wheel 18 is shown provided with an upstanding hub 22, and the wheels and blocks 14 are formed with central, registering openings 23. The stuffing boxes are shown extending into the openings of the block 14, while I have shown discharge necks 24 on a pair of upper beverage containers 25 threaded into the openings of the wheels 18. These containers 25 preferably simulate fruit and they are provided with filling plugs 26 which may well represent fruit stems or leaves, at their outer ends.

To place each container 25 in communication with the subjacent container 10, I provide a vertical tube 27 passing through the stuffing box 13 and suitably connected with the wheel 18, with the container 25, or with both. In the present showing, the upper end of this tube 27 is provided with an outstanding annular flange 28 resting on a ledge 29 within the wheel and clamped against this ledge by the neck 24, a gasket 30 being preferably interposed between the flange 28 and said neck 24. The lower end of the tube 27 is utilized to carry an appropriate agitator 31 which effectively stirs the beverage in the lower container 10.

Any desired means may be provided for rotating the two wheels 18. Preferably, I provide a chain belt 32 engaged with peripheral teeth on said wheels, and operatively associated with a sprocket wheel 33 carried by the shaft 7. A housing 34 is provided for this chain belt and the wheels 18, said housing preferably having annular upstanding portions 35 surrounding the bottom portions of the containers 25. Thus, when these containers are rotating they give the appearance of two large pieces of fruit rotating upon a support.

Preferably mounted in close proximity to the apparatus, is a suitable fruit crusher and juice extractor 36 which forms no part of the present invention, and any desired means, such as an arrangement of pulleys and belts may be used for driving both the machine 36 and the shaft 7, from an electric motor or the like 37, when the apparatus is mounted on a counter such as that disclosed at 38 in Fig. 1. However, when the device is mounted upon a motor vehicle as shown in Fig. 2, any suitable driving connections 39 may be provided, driven by one rear wheel of the machine, when the latter is jacked up.

It is very convenient to have the fruit extracting machine 36 mounted adjacent to the dispensing means, as the fruit juice may be taken from said machine and poured into the upper receptacles 25, with ease. From these receptacles, some of the juice gravitates to the lower containers 10, from which it may be withdrawn in desired quantities, through appropriate spigots 40.

It will be seen from the foregoing that the invention, although rather simple and inexpensive, will produce a very attractive display and hence will be an effective advertising medium, as well as an efficient means for containing beverages and dispensing them.

Excellent results can be obtained from the general construction disclosed and it is therefore preferably followed, but attention is again directed to the fact that within the scope of the invention as claimed, numerous modifications may be made.

I claim:

1. In a beverage dispenser, a lower container having an outlet spigot, an upper globular fruit-simulating container rotatably mounted over the lower container, the two containers being in communication, and means for rotating said upper container.

2. In a beverage dispenser, a plurality of superposed communicating beverage containers shaped to simulate fruit, means rotatably supporting at least one of said containers, and means for rotating the rotatably supported container.

3. In a beverage dispenser, a rotatably mounted beverage container shaped to simulate fruit and having a non-rotatable base representing a bowl, and means for rotating said container to give the appearance of a large piece of fruit rotating in a bowl.

4. In a beverage dispenser, a lower container having an outlet spigot, an upper globular fruit-simulating container rotatably mounted over the lower container, the two containers being in communication, a driven horizontal wheel at the lower portion of said upper container and connected with the latter for rotating it, and a housing for said wheel in close proximity to the upper container, the housing and upper container giving the appearance of a base and a large piece of fruit rotating thereon.

5. A beverage dispenser comprising two opposed arched frames, each having its legs connected by a horizontal bar, the two frames being connected at their crowns by a transverse member having a vertical bearing, a vertical driven exhibit-carrying shaft passing through said bearing and extending to the lower end of the frame structure, a pair of lower fruit-simulating beverage containers supported on said horizontal bars between said driven shaft and the legs of the arched frame and having spigots, a pair of bearing members over said lower containers, a horizontal bar connecting said bearing members with each other, other horizontal bars connecting said members with the legs of the arched frames, an upper pair of fruit-simulating containers rotatably mounted on said bearing members, and driving means for said upper containers connected with said driven shaft.

6. A beverage dispenser comprising two opposed arched frames, each having its legs connected by a horizontal bar, the two frames being connected at their crowns by a transverse member having a vertical bearing, a vertical driven exhibit-carrying shaft passing through said bearing and extending to the lower end of the frame structure, a pair of lower fruit-simulating beverage containers supported on said horizontal bars between said driven shaft and the legs of the arched frame and having spigots, a pair of bearing members over said lower containers, a horizontal bar connecting said bearing members with each other, other horizontal bars connecting said members with the legs of the arched frames, an upper pair of fruit-simulating containers rotatably mounted on said bearing members, driving means for said upper containers connected with said driven shaft, and a stationary housing for said driving means, said housing and upper containers giving the appearance of a support and large pieces of fruit rotating thereon.

7. A combined beverage dispensing and advertising machine, comprising dispensing means, and a rotating globular object mounted adjacent the same, a portion of said object simulating one kind of fruit and another portion thereof representing another kind of fruit.

8. A structure as specified in claim 5; the exhibit carried by said shaft simulating part of an orange and part of an apple.

In testimony whereof I have hereunto affixed my signature.

ALVA A. SHAW.